US008461266B2

(12) United States Patent
Junqvist et al.

(10) Patent No.: US 8,461,266 B2
(45) Date of Patent: Jun. 11, 2013

(54) CABLE AND POLYMER COMPOSITION COMPRISING A MULTIMODAL ETHYLENE COPOLYMER

(75) Inventors: Jonas Junqvist, Stenungsund (SE); Hans Eklind, Stenungsund (SE); Bernt-Ake Sultan, Stenungsund (SE); Katrin Nord-Varhaug, Porsgrunn (NO); Philipp Walter, Lorrach (DE)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/126,982

(22) PCT Filed: Oct. 12, 2009

(86) PCT No.: PCT/EP2009/063286
§ 371 (c)(1),
(2), (4) Date: Jun. 20, 2011

(87) PCT Pub. No.: WO2010/049263
PCT Pub. Date: May 6, 2010

(65) Prior Publication Data
US 2011/0240333 A1 Oct. 6, 2011

(30) Foreign Application Priority Data
Oct. 31, 2008 (EP) .................................... 08168049

(51) Int. Cl.
*C08F 8/00* (2006.01)
*C08L 23/00* (2006.01)
*C08L 23/04* (2006.01)

(52) U.S. Cl.
USPC ........................................ 525/191; 525/240

(58) Field of Classification Search
USPC ................................. 525/191, 240
See application file for complete search history.

(56) References Cited

U.S. PATENT DOCUMENTS

| | | | |
|---|---|---|---|
| 3,242,150 A | 3/1966 | Scoggin | |
| 3,324,093 A | 6/1967 | Alleman | |
| 3,374,211 A | 3/1968 | Marwil et al. | |
| 3,405,109 A | 10/1968 | Rohlfing | |
| 4,532,311 A | 7/1985 | Fulks et al. | |
| 4,543,399 A | 9/1985 | Jenkin et al. | |
| 4,578,879 A | 4/1986 | Yokoyama et al. | |
| 4,582,816 A | 4/1986 | Miro | |
| 4,621,952 A | 11/1986 | Aronson | |
| 4,803,251 A | 2/1989 | Goode et al. | |
| 4,855,370 A | 8/1989 | Chirillo et al. | |
| 4,933,149 A | 6/1990 | Rhee et al. | |
| 5,026,795 A | 6/1991 | Hogan | |
| 5,391,654 A | 2/1995 | Ahvenainen et al. | |
| 6,441,309 B1 | 8/2002 | Jow et al. | |
| 6,797,886 B1 * | 9/2004 | Gustafsson et al. ...... 174/110 R |
| 2007/0049711 A1 | 3/2007 | Kuo et al. | |
| 2008/0196922 A1 | 8/2008 | Van Marion et al. | |

FOREIGN PATENT DOCUMENTS

| | | |
|---|---|---|
| EP | 0188125 A2 | 7/1986 |
| EP | 0250169 A2 | 12/1987 |
| EP | 0369436 A2 | 5/1990 |
| EP | 0479186 A2 | 4/1992 |
| EP | 0499759 A1 | 8/1992 |
| EP | 0503791 A1 | 9/1992 |
| EP | 0560035 A1 | 9/1993 |
| EP | 0579426 A1 | 1/1994 |
| EP | 0600414 A1 | 6/1994 |
| EP | 0721798 A2 | 7/1996 |
| EP | 0699213 B1 | 2/1998 |
| EP | 0684871 B1 | 5/1998 |
| EP | 0707513 B1 | 9/1998 |
| EP | 0881237 A1 | 12/1998 |
| EP | 0891990 A2 | 1/1999 |
| EP | 0782587 B1 | 2/1999 |
| EP | 0696293 B1 | 5/2000 |
| EP | 1310295 A1 | 5/2003 |
| EP | 1415999 A1 | 5/2004 |
| EP | 1591459 A1 | 11/2005 |
| EP | 1591460 A1 | 11/2005 |
| EP | 1600276 A1 | 11/2005 |
| EP | 1634913 A1 | 3/2006 |
| EP | 1739103 A1 | 1/2007 |
| EP | 1739110 A1 | 1/2007 |
| EP | 1752462 A1 | 2/2007 |
| EP | 1539775 B1 | 1/2008 |
| EP | 1633466 B1 | 3/2010 |
| WO | WO9212182 | 7/1992 |
| WO | WO9425495 | 11/1994 |
| WO | WO9618662 | 6/1996 |
| WO | WO9728170 | 8/1997 |
| WO | WO9749764 | 12/1997 |
| WO | WO9750093 | 12/1997 |

(Continued)

OTHER PUBLICATIONS

International Search Report and Written Opinoin for PCT/EP2009/063286 dated Feb. 4, 2010.

(Continued)

*Primary Examiner* — Nathan M Nutter
(74) *Attorney, Agent, or Firm* — Meunier Carlin & Curfmann, LLC

(57) ABSTRACT

The present invention relates to a cable comprising a conductor surrounded by one or more layers, wherein at least one layer comprises a polymer composition comprising a multimodal copolymer of ethylene with one or more comonomers, to a process for producing the cable and to a polymer composition suitable as a cable layer material.

13 Claims, 1 Drawing Sheet

FOREIGN PATENT DOCUMENTS

| | | |
|---|---|---|
| WO | WO9815591 | 4/1998 |
| WO | WO9832776 | 7/1998 |
| WO | WO9903902 | 1/1999 |
| WO | WO9961489 | 12/1999 |
| WO | WO0026258 | 5/2000 |
| WO | WO0029452 | 5/2000 |
| WO | WO0103147 A1 | 1/2001 |
| WO | WO0105845 A1 | 1/2001 |
| WO | WO03010208 A1 | 2/2003 |
| WO | WO03051514 A1 | 6/2003 |
| WO | WO03051934 A2 | 6/2003 |
| WO | WO2004085499 A2 | 10/2004 |
| WO | WO2005002744 A1 | 1/2005 |
| WO | WO2005087361 A1 | 9/2005 |
| WO | WO2007025640 A1 | 3/2007 |

OTHER PUBLICATIONS

Office Action for U.S. Appl. No. 13/126,987 dated Jan. 17, 2013.

* cited by examiner

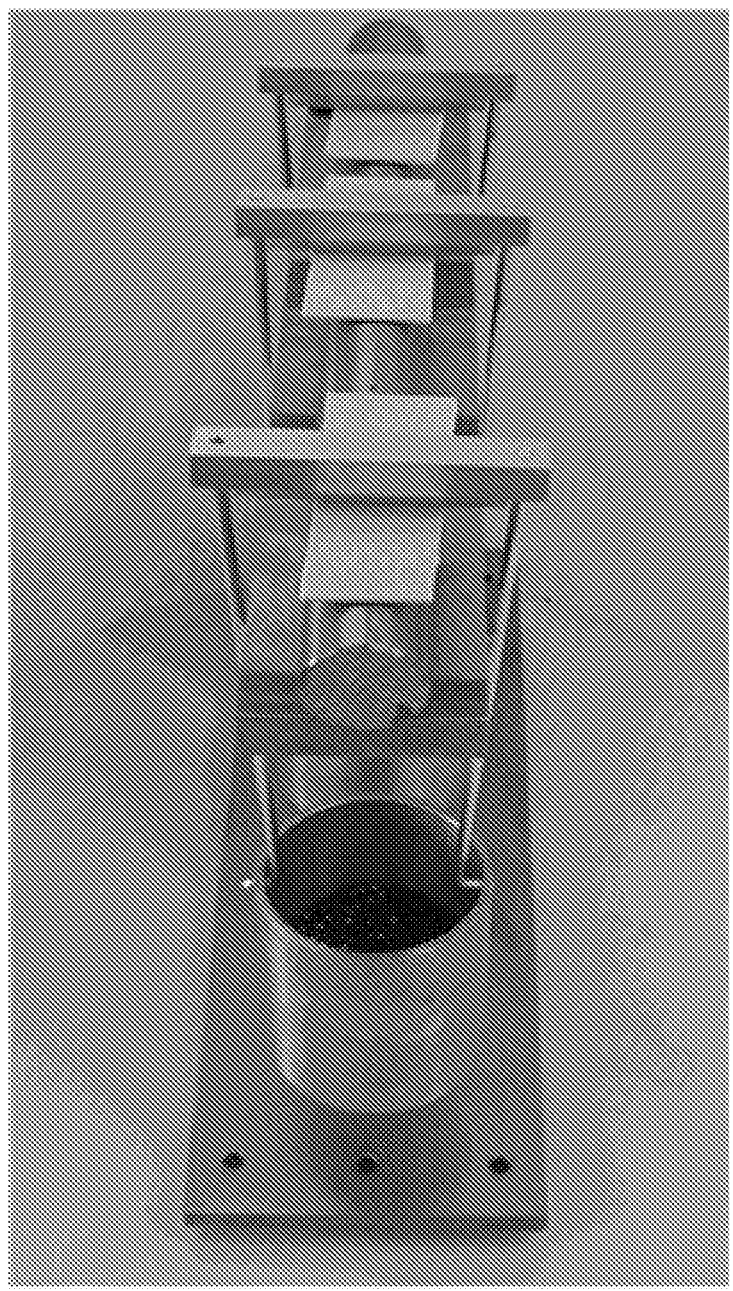

CABLE AND POLYMER COMPOSITION COMPRISING A MULTIMODAL ETHYLENE COPOLYMER

TECHNICAL FIELD

The present invention is directed to a cable surrounded by at least one layer comprising a multimodal copolymer of ethylene, to a preparation process thereof, to a polymer composition comprising a multimodal copolymer of ethylene, as well as to a use thereof for producing a cable layer.

BACKGROUND ART

A typical electric cable generally comprises a conductor that is surrounded by one or more layers depending on the application area. E.g. power cable has several layers of polymeric materials including an inner semiconducting layer, followed by an insulating layer, and then an outer semiconducting layer. To these layers, one or more further auxiliary layer(s) may be added. The outer protecting polymeric layer is known i.a. as a jacketing layer. Any of the layers can be crosslinked as well known in the field.

One of the targets in polymer, i.a. polyethylene (PE) polymer, development has been to combine i.a. high flexibility while maintaining other useful mechanical properties. For instance desired mechanical properties in wire and cable (W&C) applications, e.g. in linear low density polyethylene (LLDPE) jacketing layer applications, include i.a. abrasion resistance.

Moreover, the combination of a high heat distortion temperature (HDT) and a high flexibility is desirable for polymers, such as LLDPE, e.g. when used e.g. in cable layers, such as in jacketing layer. However, in general a higher flexibility results normally in a lower heat distortion temperature.

Multimodal PE provides one way of tailoring the polymer properties. Moreover, e.g. single site catalyst (SSC) offers a controlled incorporation of comonomers which provides a further means for tailoring the polymer. However one of the major problems of PE produced using SSC is often the processability of the polymers.

There is a continuous need in the polymer field to find polymers which are suitable for demanding polymer applications, particularly for W&C applications, where the cable materials must meet high requirements and stringent authority regulations.

OBJECTS OF THE INVENTION

One of the objects of the present invention is to provide an alternative cable with one or more layer(s) wherein at least one layer contains a polyethylene polymer composition with improved mechanical properties. Preferably, the polyethylene polymer composition is also feasible to process including i.a. feasible to extrude and to form to one or more cable layer(s), preferably to at least a jacketing layer, with acceptable layer properties of the obtained layer. Also a preparation process of said cable is provided.

A further object of the invention is to provide a polymer composition which comprises a multimodal polyethylene polymer having excellent mechanical properties combined with good processing properties. Moreover a preparation method and use thereof in a cable layer is provided.

SUMMARY OF THE INVENTION

Accordingly, the invention is directed to a cable comprising a conductor surrounded by one or more layers, wherein at least one layer comprises a polymer composition comprising a multimodal copolymer of ethylene with one or more comonomer(s), wherein the multimodal ethylene copolymer comprises (A) from 10 to 90% by weight, preferably 30 to 70% by weight, based on the combined amount of components (A) and (B), of a higher density copolymer of ethylene which has a density of from 940 kg/m$^3$ or less, and (B) from 10 to 90% by weight, preferably 30 to 70% by weight, based on the combined amount of components (A) and (B), of a lower density copolymer of ethylene which has a density of from less than 925 kg/m$^3$, and wherein the multimodal copolymer of ethylene has a density of less than 940 kg/m$^3$ and a flexural modulus of 400 MPa or less.

The term "multimodal" means herein, unless otherwise stated, that the Polymer composition comprises at least two different polymer components (A) and (B) and that the polymer components (A) and (B) differ from each other of having at least different densities. Additionally, the PE copolymer may also be multimodal with respect to differences between comonomer content and/or the molecular weight distribution (MWD) of polymer (A) and polymer (B). The multimodality with respect to molecular weight distribution includes also bimodalty with respect to MWD, and means herein, generally, a polyethylene comprising at least two polyethylene fractions, which have been produced under different polymerization conditions resulting in different (weight average) molecular weights and molecular weight distributions for the fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product. In case the PE copolymer is multimodal also with respect to MWD, then the higher density polymer (A) preferably has a lower molecular weight (LMW) and the lower density polymer (B) has a higher molecular weight (HMW).

The cable of the invention is referred herein as Cable. The "polymer composition of the invention" is referred herein as the Polymer composition and the "multimodal copolymer of ethylene with one or more comonomer(s) of the invention" is referred herein interchangeably as multimodal PE copolymer or shortly as PE copolymer.

The polymer composition comprising the multimodal copolymer of ethylene having the density and comprising the higher density and lower density components (A) and (B) with the densities as defined in claim 1 provides a Cable layer with highly advantageous flexibility. Moreover, the polymer composition of the invention has also preferably a surprisingly high heat distortion temperature (HDT) at a given flexural modulus or, respectively, a lower flexural modulus at a given HDT. Without limiting to any theory the density split between the higher density and lower density components contributes to the high flexibility and to the preferable property balance of flexibility and HDT as mentioned above.

The term "conductor" means herein above and below that the conductor comprises one or more wires. Moreover, the cable may comprise one or more such conductors. Preferably the conductor is an electrical conductor.

"Cable" covers all type of wires and cables used in the wire and cable (W&C) applications.

The cable may comprise two or more layers comprising the Polymer composition. The said at least one layer of the Cable comprising the Polymer composition is preferably a jacketing layer.

The invention is also directed to a process for producing said Cable, comprising steps of applying, preferably by (co) extrusion, one or more layers on a conductor, which layers comprise a polymer, wherein at least one layer comprises said polymer composition of the invention.

The Polymer composition is highly feasible for use as a cable layer, preferably at least a jacketing layer. As a subgroup falling under the suitable Polymer composition for use in the Cable as defined above, the invention further provides independently a Polymer composition (Pc') which comprises the multimodal PE copolymer, wherein the multimodal ethylene copolymer the multimodal ethylene copolymer comprises (A) from 10 to 90% by weight, preferably from 30 to 70% by weight, based on the combined amount of components (A) and (B), of a higher density copolymer of ethylene and has a density of from 940 kg/m$^3$ or less, and (B) from 10 to 90% by weight, preferably from 30 to 70% by weight, based on the combined amount of components (A) and (B), of a lower density copolymer of ethylene and has a density of less 925 kg/m$^3$, and wherein the multimodal copolymer of ethylene has a density of less than 940 kg/m$^3$, a flexural modulus of 400 MPa or less and, additionally MFR$_2$ of 0.1 to 5.0 g/10 min.

In addition to W&C applications the Polymer composition (Pc') can be used in other polymer applications as well.

The preferable properties and embodiments of the Cable, Polymer composition including the independent subgroup Polymer composition (Pc'), the PE copolymer, as well as the preparation processes of these are described below. As evident said preferable properties and embodiments are given in general terms meaning that they can be combined in any combination to further define the preferable embodiments of the invention.

FIGURES

FIG. 1: Shows an experimental set up of Heat Distortion Temperature (HDT) test (pressure test at high temperature) as described below under "Determination methods". In the made test of the described samples a 3 mm wire was used instead of the cylinder shown in the picture.

DETAILED DESCRIPTION

The Polymer composition comprises the PE copolymer as defined above. The below description applies naturally both for the Polymer composition of the Cable and for the independent Polymer composition (Pc') which is also the preferred subgroup of the Polymer composition of the Cable. If not specified in the description part, then the measurement methods for the further preferable properties as defined below for the Polymer composition of the Cable are described later below under "Determination methods".

PE Copolymer

The PE copolymer preferably comprises
(A) from 10 to 90% by weight, preferably from 40 to 60% by weight, based on the combined amount of components (A) and (B), of a higher density copolymer of ethylene with one or more alpha-olefin comonomer(s) having from 3 to 20, preferably 4 to 10 carbon atoms, more preferably 4 to 8 carbon atoms, and (B) from 10 to 90% by weight, preferably from 40 to 60% by weight, based on the combined amount of components (A) and (B), of a lower density copolymer of ethylene with one or more alpha-olefin comonomer(s) having from 3 to 20, preferably 4 to 10 carbon atoms, more preferably 4 to 8 carbon atoms.

Comonomer as used herein means monomer units other than ethylene which are copolymerisable with ethylene.

The term "PE copolymer" as used herein encompasses polymers comprising repeat units deriving from ethylene and at least one other C3-20 alpha olefin monomer. Preferably, PE copolymer may be formed from ethylene together with at least one C4-10 alpha-olefin comonomer, e.g. 1-butene, 1-hexene or 1-octene. Preferably, PE copolymer is a binary copolymer, i.e. the polymer contains ethylene and one comonomer, or a terpolymer, i.e. the polymer contains ethylene and two or three comonomers. Preferably, PE copolymer comprises an ethylene hexene copolymer, ethylene octene copolymer or ethylene butene copolymer. The amount of comonomer present in PE copolymer is at least 0.25 mol-%, preferably at least 0.5 mol-%, such as preferably 0.5 to 10 mol %, e.g. 2 to 10 mol-% relative to ethylene. In some embodiments a comonomer range of 4.0 to 8.0 mol-% may be desired. Alternatively, comonomer contents present in PE copolymer may be 0.5 to 25 wt %, especially 2 to 12 wt % relative to ethylene. In (A) higher density PE copolymer component, preferably at least 0.5 mol-%, e.g. at least 1.0 mol %, such as up to 5 mol-%, of repeat units are derived from said comonomer. In (B) lower density PE copolymer component, preferably at least 2.0 mol-%, e.g. at least 3.0 mol %, such as up to 10 mol-%, of repeat units are derived from said comonomer.

The higher density copolymer of ethylene (A) has preferably a density of at least 905 kg/m$^3$, preferably from 905 to 937 kg/m$^3$, more preferably from 908 to 937 kg/m$^3$. In one preferable embodiment (A1) the higher density copolymer of ethylene (A) has preferably a density of at least 910 kg/m$^3$, preferably from 915 to 937 kg/m$^3$, more preferably from 918 to 937 kg/m$^3$.

The lower density copolymer of ethylene (B) has a density of from 870 to 925 kg/m$^3$, preferably from 870 to 915 kg/m$^3$, more preferably 880 to 910 kg/m$^3$.

Preferably the density difference between the component (A) and (B) of the Polymer composition is at least 10 kg/m$^3$, preferably at least 15 kg/m$^3$, more preferably at least 20 kg/m$^3$, and even over 25 kg/m$^3$ can be preferred, depending on the embodiment.

The PE copolymer has preferably the density of from 890 to 930 kg/m$^3$, preferably of from 900 to 925 kg/m$^3$, preferably of from 900 to 920 kg/m$^3$, preferably of from 905 to 918 kg/m$^3$.

The PE copolymer preferably has a weight average molecular weight of from 80 000 g/mol to 500 000 g/mol, more preferably from 100000 g/mol to 250000 g/mol and in particular from 120000 g/mol to 220000 g/mol.

The higher density ethylene copolymer (A) of the higher density PE copolymer has preferably a weight average molecular weight of at least 80000 g/mol, more preferably of from 90000 to 1000000, more preferably 95000 to 500000 g/mol.

The lower density ethylene copolymer (B) of the PE copolymer has preferably a weight average molecular weight of at least 70000 g/mol, more preferably of from 90000 to 1000000, more preferably 95000 to 500000 g/mol.

The multimodal PE copolymer has preferably a flexural modulus of 350 MPa or less, preferably 300 MPa or less, preferably of from 80 to 280 MPa, more preferably of from 100 to 280 MPa.

In one preferable embodiment were a low density of PE copolymer is desirable, the density of PE copolymer is preferably of from 905 to 918 kg/m$^3$. In this embodiment the flexural modulus is preferably less than 300 MPa, preferably of from 80 to 280 MPa. In this embodiment preferably the higher density ethylene copolymer (A) of the PE copolymer has a density of from 908 to 937 kg/m$^3$. Furthermore, in this embodiment preferably the lower density ethylene copolymer (B) of the PE copolymer has a density of from 870 to 925 kg/m$^3$.

The multimodal PE copolymer of the polymer composition has preferably an MWD (Mn/Mw) of from 1.5 to 20, preferably from 2.0 to 15, preferably from 2.5 to 10.0.

The PE copolymer preferably has an MFR$_2$ of from 0.1 to 5.0 g/10 min, preferably from 0.1 to 3.0 g/10 min, preferably from 0.15 to 2.5 g/10 min, more preferably from 0.2 to 2.0 g/10 min.

In one preferable embodiment the PE copolymer has an Mz of at least 200 000, preferably at least 250 000, preferably from 300 000 to 1000 000, more preferably from 320 000 to 700 000. In this embodiment the PE copolymer has preferably an Mz/Mw of at least 2.45, preferably of at least 2.50, preferably of from 2.55 to 15.0, preferably of from 2.60 to 10.00, more preferably of at least 2.65 to 10.00.

In a preferred embodiment of the invention, the Polymer composition passes the temperature of 90° C., preferably passes the temperature of 100° C., more preferably passes the temperature of 115° C. in a Heat Distortion Temperature (HDT) as described below in the Determination methods. HDT test is an indication of resistance to heat deformation. In this embodiment the higher density copolymer of ethylene (A) with the higher density range as defined in embodiment (A1) is preferred.

The amounts of higher density and lower density components of PE copolymer are preferably:
the amount of higher density ethylene copolymer (A) is of 10 to 90, preferably of 30 to 70, more preferably of 40 to 60, wt %; and
the amount of lower density ethylene copolymer (B) is of 10 to 90, preferably of 30 to 70 more preferably of 40 to 60, wt %; based on the combined amount of components (A) and (B).

As a subgroup of the PE copolymer suitable for the Cable, the invention further provides independently a Polymer composition (Pc') comprising a multimodal copolymer of ethylene which is the PE copolymer as defined above and which comprises
(A) from 10 to 90% by weight, preferably from 30 to 70% by weight, based on the combined amount of components (A) and (B), of a higher density copolymer of ethylene and has a density of from 940 kg/m$^3$ or less, and
(B) from 10 to 90% by weight, preferably from 30 to 70% by weight, based on the combined amount of components (A) and (B), of a lower density copolymer of ethylene and has a density of less 925 kg/m$^3$, and wherein
the multimodal copolymer of ethylene has a density of less than 940 kg/m$^3$ a flexural modulus of 400 MPa or less and, additionally, an MFR$_2$ of 0.1 to 5.0 g/10 min.

More preferably in this independent (Pc') subgroup, the multimodal PE copolymer has the flexural modulus of 350 MPa or less, preferably 300 MPa or less, preferably of from 80 to 280 MPa, more preferably of from 100 to 280 MPa, and MFR$_2$ of from 0.1 to 3.0 g/10 min, preferably from 0.15 to 2.5 g/10 min, more preferably from 0.2 to 2.0 g/10 min and the density of from 890 to 930 kg/m$^3$, preferably from 900 to 925 kg/m$^3$, preferably from 900 to 920 kg/m$^3$, more preferably from 905 to 918 kg/m$^3$. More preferably, the density difference between the component (A) and (B) of the subgroup Polymer composition Pc' is at least 10 kg/m$^3$, preferably at least 15 kg/m$^3$, more preferably at least 20 kg/m$^3$, and even over 25 kg/m$^3$ may be preferred, depending on the desired embodiment.

In this independent subgroup of the Polymer composition (Pc') the PE copolymer has more preferably at least one, preferably two or more, in any combination, of the following further properties,
(i) the higher density copolymer of ethylene (A) has preferably a density of at least 905 kg/m$^3$, preferably from 905 to 937 kg/m$^3$, more preferably from 908 to 937 kg/m$^3$ and the lower density copolymer of ethylene (B) has a density of from 870 to 925 kg/m$^3$, preferably from 870 to 915 kg/m$^3$, more preferably 880 to 910 kg/m$^3$,
(ii) the amount of higher density ethylene copolymer (A) is of 30 to 70, preferably of 40 to 60, preferably of 45 to 55, more preferably of 48 to 54, wt % and the amount of lower density ethylene copolymer (B) is of 70 to 30, preferably of 60 to 40, preferably of 55 to 45 more preferably of 52 to 46, wt %; based on the combined amount of components (A) and (B),
(iii) a MWD (Mn/Mw) of from 1.5 to 20, preferably from 2.0 to 15, preferably from 2.5 to 10.0, or
(iv) Melt index MFR$_2$ of from 0.1 to 3.0 g/10 min, preferably from 0.15 to 2.5 g/10 min, preferably from 0.2 to 2.0 g/10 min, or
(v) the density of the polyethylene copolymer of from 905 to 918 kg/m$^3$, the flexural modulus less than 300 MPa and the polyethylene copolymer comprises the higher density ethylene copolymer (A) having a density of from 908 to 937 kg/m$^3$ and the lower density ethylene copolymer (A) having a density of from 870 to 925 kg/m$^3$,
preferably has at least two, more preferably all the above properties (i) to (v).

The preferred PE copolymer of the Polymer composition, including any embodiments and the subgroup Polymer composition (Pc'), is obtainable by polymerising ethylene in the presence of a single site catalyst and an activator for said catalyst (the combination is also referred herein shortly as a single site catalyst, as evident for a skilled person). Preferably both ethylene copolymer components (A) and (B) are obtainable by a polymerising ethylene in the presence of a single site catalyst. The single site catalyst used for producing the ethylene copolymer components (A) and (B) may be the same or different. In one preferable embodiment the multimodal ethylene copolymer comprises a higher density copolymer of ethylene (A) which has a low molecular weight (LMW) and a higher density copolymer of ethylene (B) which has a high molecular weight (HMW), and is obtainable by polymerising ethylene in the presence of a single site catalyst and an activator for said catalyst. In case of this preferable embodiment the higher density polymer (A) and the lower density polymer (B) are preferably obtainable by using the same catalyst, preferably the same single site catalyst. The preferred embodiment of the invention is thus based on a polymer composition suitable for a cable layer, which polymer has advantageous properties and is produced by a single site catalyst. Naturally the polymerisation of ethylene occurs together with monomer units of one or more comonomer(s).

The expressions "obtainable by" or "produced by" are used herein interchangeably and mean the category "product by process", i.e. that the product has a technical feature which is due to the preparation process.

The PE copolymer may comprise further polymer components, e.g. three components being a trimodal PE copolymer. The amount of such further components is preferably up to 10 wt %, preferably up to 5 wt %, based on the amount of the PE copolymer. Preferably the PE copolymer consists of higher density and lower density polymer components. Optionally in the multimodal PE copolymer, e.g. the preferable bimodal PE copolymer, ethylene copolymer components (A) and (B) may each independently also comprise e.g. up to 5 wt % of a well known polyethylene prepolymer which is obtainable from a prepolymerisation step as well known in the art, e.g. as described in WO9618662. In case of such prepolymer, the prepolymer component is typically comprised in one of higher density and lower density components, or alternatively forms a separate polymer with e.g. different density and/or MWD, i.e. further component, of the PE copolymer.and thus contributes to the multimodality with respect to densities and/or MWD, By ethylene homopolymer is meant a polymer which substantially consists of ethylene units. As the process streams may have a small amount of other polymerisable species as impurities the homopolymer may contain a small amount of units other than ethylene. The content of such units should be lower than 0.2% by mole, preferably less than 0.1% by mole.

Polymerisation Process

The multimodal (e.g. bimodal) PE copolymer can be obtainable by blending mechanically together two or more separate polymer components or by in-situ blending in a multistage polymerisation process during the preparation process of the polymer components. Both mechanical and in-situ blending are well known in the field. The preferred multimodal PE copolymer is preferably produced in a multistage polymerisation process in the presence of a single site catalyst.

In the multistage polymerisation process ethylene and alpha-olefins having from 4 to 10 carbon atoms are polymerised in a process comprising at least two polymerisation stages. Each polymerisation stage may be conducted in a separate reactor but they may also be conducted in at least two distinct polymerisation zones in one reactor. Preferably, the multistage polymerisation process is conducted in at least two cascaded polymerisation stages.

Catalyst

The polymerisation of each ethylene copolymer component (A) and (B) is preferably conducted in the presence of the same or different single site polymerisation catalyst. Preferably the single site catalyst is a metallocene catalyst. Such catalysts comprise a transition metal compound which typically contains an organic ligand, preferably a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups and like. Suitable metallocene compounds are known in the art and are disclosed, among others, in WO-A-97/28170, WO-A-98/32776, WO-A-99/61489, WO-A-03/010208, WO-A-03/051934, WO-A-03/051514, WO-A-2004/085499, WO-A-2005/002744, EP-A-1752462 and EP-A-1739103.

Especially it has been found that metallocene compounds having hafnium as the transition metal atom or metallocene compounds comprising an indenyl or tetrahydroindenyl type ligand often have the desired characteristics.

One example of suitable metallocene compounds is the group of metallocene compounds having zirconium, titanium or hafnium as the transition metal and one or more ligands having indenyl structure bearing a siloxy substituent, such as [ethylenebis(3,7-di(tri-isopropylsiloxy)inden-1-yl)]zirconium dichloride (both rac and meso), [ethylenebis(4,7-di(tri-isopropylsiloxy)inden-1-yl)]zirconium dichloride (both rac and meso), [ethylenebis(5-tert-butyldimethylsiloxy)inden-1-yl)]zirconium dichloride (both rac and meso), bis(5-tert-butyldimethylsiloxy)inden-1-yl)zirconium dichloride, [dimethylsilylenebis(5-tert-butyldimethylsiloxy)inden-1-yl)] zirconium dichloride (both rac and meso), (N-tert-butylamido)(dimethyl)($\eta^5$-inden-4-yloxy)silanetitanium dichloride and [ethylenebis(2-(tert-butydimethylsiloxy)inden-1-yl)]zirconium dichloride (both rac and meso).

Another example is the group of metallocene compounds having hafnium as the transition metal atom and bearing a cyclopentadienyl type ligand, such as bis(n-butylcyclopentadienyl)hafnium dichloride, bis(n-butylcyclopentadienyl) dibenzylhafnium, dimethylsilylenenebis(n-butylcyclopentadienyl)hafnium dichloride (both rac and meso) and bis[1,2,4-tri(ethyl)cyclopentadienyl]hafnium dichloride.

Still another example is the group of metallocene compounds bearing a tetrahydroindenyl ligand such as bis(4,5,6,7-tetrahydroindenyl)zirconium dichloride, bis(4,5,6,7-tetrahydroindenyl)hafnium dichloride, ethylenebis(4,5,6,7-tetrahydroindenyl)zirconium dichloride, dimethylsilylenebis (4,5,6,7-tetrahydroindenyl)zirconium dichloride.

It is evident that the single site catalyst typically also comprises an activator. Generally used activators are alumoxane compounds, such as methylalumoxane (MAO), tetraisobutylalumoxane (TIBAO) or hexaisobutylalumoxane (HIBAO). Also boron activators, such as those disclosed in US-A-2007/049711 may be used. The activators mentioned above may be used alone or they may be combined with, for instance, aluminium alkyls, such as triethylaluminium or tri-isobutylaluminum.

The catalyst is preferably supported. The support may be any particulate support, including inorganic oxide support, such as silica, alumina or titania, or polymeric support, such as polymer comprising styrene or divinylbenzene.

The catalyst may also comprise the metallocene compound on solidified alumoxane or it may be a solid catalyst prepared according to emulsion solidification technology. Such catalysts are disclosed, among others, in EP-A-1539775 or WO-A-03/051934.

Polymerisation

It is evident that the claimed properties as such, i.e. individually, are very well known, but the claimed balance thereof (i.e. combination of the claimed ranges) is novel and surprisingly suitable for W&C applications. The new property balance can be obtained by controlling the process conditions and optionally by choice of catalyst, which can be a conventional catalyst, as well known to a skilled person. E.g. the densities of the higher density and lower density components (A) and (B) and the final PE copolymer can be controlled i.a. by adapting any or or all of the split, the comonomer incorporation (comonomer feed), chain length of the polymerised polymer, hydrogen feed, as well known in the art. Also the multimodality with respect to molecular weights, if additionally desired, can be obtained and controlled as described above or below.

The multimodal PE copolymer may be produced by mechanical blending i.a. in the conventional manner the higher density ethylene polymer (A) and the lower density ethylene polymer (B) which each component can be independently commercially available or be produced analogously with i.a. any suitable polymerisation process well known and documented in the art. The multimodal PE copolymer may also be produced in-situ in a multistage process which can be i.a. any suitable polymerisation process known in the art. Into the polymerisation zone a catalyst, ethylene, optionally an inert diluent, and optionally hydrogen and/or comonomer are introduced. The higher density ethylene polymer component is preferably produced in a first polymerisation zone and the lower density ethylene copolymer component is produced in a second polymerisation zone. The first polymerisation zone and the second polymerization zone may be connected in any order, i.e. the first polymerisation zone may precede the second polymerisation zone, or the second polymerisation zone may precede the first polymerisation zone or, alternatively, polymerisation zones may be connected in parallel. However, it is preferred to operate the polymerisation zones in cascaded mode. The polymerisation zones may operate in slurry, solution, or gas phase conditions or in any combinations thereof. Suitable reactor configurations are disclosed, among others, in WO-A-92/12182, EP-A-369436, EP-A-503791, EP-A-881237 and WO-A-96/18662. Examples of processes where the polymerisation zones are arranged within one reactor system are disclosed in WO-A-99/03902, EP-A-782587 and EP-A-1633466.

It is often preferred to remove the reactants of the preceding polymerisation stage from the polymer before introducing it into the subsequent polymerisation stage. This is preferably done when transferring the polymer from one polymerisation stage to another. Suitable methods are disclosed, among others, in EP-A-1415999 and WO-A-00/26258.

The polymerisation in the polymerisation zone may be conducted in slurry. The catalyst can be fed e.g. in a conventional manner to the reactor. Then the polymer particles formed in the polymerisation, together with the catalyst fragmented and dispersed within the particles, are suspended in the fluid hydrocarbon. The slurry is agitated to enable the transfer of reactants from the fluid into the particles.

The polymerisation usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 2 to about 50% by mole, preferably from about 3 to about 20% by mole and in particular from about 5 to about 15% by mole. The benefit of having a high ethylene concentration is that the productivity of the catalyst is increased but the drawback is that more ethylene then needs to be recycled than if the concentration was lower.

The temperature in the slurry polymerisation is typically from 50 to 115° C., preferably from 60 to 110° C. and in particular from 70 to 105° C. The pressure is from 1 to 150 bar, preferably from 10 to 100 bar.

The slurry polymerisation may be conducted in any known reactor used for slurry polymerisation. Such reactors include a continuous stirred tank reactor and a loop reactor. It is especially preferred to conduct the polymerisation in a loop reactor. In such reactors the slurry is circulated with a high velocity along a closed pipe by using a circulation pump. Loop reactors are generally known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

It is sometimes advantageous to conduct the slurry polymerisation above the critical temperature and pressure of the fluid mixture. Such operation is described in U.S. Pat. No. 5,391,654. In such operation the temperature is typically from 85 to 110° C., preferably from 90 to 105° C. and the pressure is from 40 to 150 bar, preferably from 50 to 100 bar.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. No. 3,374,211, U.S. Pat. No. 3,242,150 and EP-A-1310295. Continuous withdrawal is disclosed, among others, in EP-A-891990, EP-A-1415999, EP-A-1591459, EP-A-1591460 and WO-A-2007/025640. The continuous withdrawal is advantageously combined with a suitable concentration method, as disclosed in EP-A-1310295 and EP-A-1591460.

If the higher density ethylene polymer is produced in slurry polymerisation stage and has also a low molecular weight, then hydrogen is added to the slurry reactor so that the molar ratio of hydrogen to ethylene in the reaction phase is from 0.1 to 1.0 mol/kmol, and preferably from 0.2 to 0.7 mol/kmol. Comonomer may then also be introduced into the slurry polymerisation stage so that the molar ratio of comonomer to ethylene in the reaction phase does not exceed 150 mol/kmol.

If the lower density ethylene polymer is produced in slurry polymerisation stage and has also a high molecular weight, then hydrogen is added to the slurry reactor so that the molar ratio of hydrogen to ethylene in the reaction phase is at most 0.1 mol/kmol, preferably from 0.01 to 0.07 mol/kmol. Especially preferably, no hydrogen is introduced into the slurry polymerisation stage. Comonomer is introduced into the slurry polymerisation stage so that the molar ratio of comonomer to ethylene is from 30 to 120 mol/kmol.

The polymerisation may also be conducted in gas phase. In a fluidised bed gas phase reactor an olefin is polymerised in the presence of a polymerisation catalyst in an upwards moving gas stream. The reactor typically contains a fluidised bed comprising the growing polymer particles containing the active catalyst located above a fluidisation grid.

The polymer bed is fluidised with the help of the fluidisation gas comprising the olefin monomer, eventual comonomer(s), eventual chain growth controllers or chain transfer agents, such as hydrogen, and eventual an inert gas. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871.

From the inlet chamber the gas flow is passed upwards through a fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087361. Other types of fluidisation grids are disclosed, among others, in U.S. Pat. No. 4,578,879, EP-A-600414 and EP-A-721798. An overview is given in Geldart and Bayens: The Design of Distributors for Gas-fluidized Beds, Powder Technology, Vol. 42, 1985.

The fluidisation gas passes through the fluidised bed. The superficial velocity of the fluidisation gas must be higher that minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are know by using common engineering practise. An overview is given, among others in Geldart: Gas Fluidization Technology, J. Wiley & Sons, 1986.

When the fluidisation gas is contacted with the bed containing the active catalyst the reactive components of the gas, such as monomers and chain transfer agents, react in the presence of the catalyst to produce the polymer product. At the same time the fluidisation gas removes the reaction heat from the polymerising particles in the fluidised bed.

The unreacted fluidisation gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerisable components, such as n-pentane, isopentane, n-butane or isobutene, which are at least partially condensed in the cooler.

The gas is then compressed, cooled and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerisation.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerisation stage. The polymer particles may be introduced into the gas phase reactor as disclosed in EP-A-1415999 and WO-A-00/26258.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed level.

Also antistatic agent(s) may be introduced into the gas phase reactor if needed. Suitable antistatic agents and methods to use them are disclosed, among others, in U.S. Pat. No. 5,026,795, U.S. Pat. No. 4,803,251, U.S. Pat. No. 4,532,311, U.S. Pat. No. 4,855,370 and EP-A-560035. They are usually polar compounds and include, among others, water, ketones, aldehydes and alcohols.

The reactor may also include a mechanical agitator to further facilitate mixing within the fluidised bed. An example of suitable agitator design is given in EP-A-707513.

If the higher density ethylene polymer is produced in gas phase polymerisation stage and has also a low molecular weight, then hydrogen is added to the gas phase reactor so that the molar ratio of hydrogen to ethylene is from 0.1 to 1.0 mol/kmol, and preferably from 0.2 to 0.7 mol/kmol. Comonomer may then also be introduced into the gas phase polymerisation stage so that the molar ratio of comonomer to ethylene does not exceed 150 mol/kmol.

If the lower density ethylene polymer is produced in gas phase polymerisation stage and has also a high molecular weight, then hydrogen is added to the gas phase reactor so that the molar ratio of hydrogen to ethylene is at most 0.6 mol/kmol, preferably at most 0.5 mol/kmol. Comonomer is introduced into the gas phase polymerisation stage so that the molar ratio of comonomer to ethylene is typically from 30 to 120 mol/kmol.

Where the other of the component(s), e.g. the higher molecular weight component, is made as a second step in a multistage polymerisation it is not possible to measure its properties directly. However, e.g. the density, $MFR_2$ etc of the component, e.g. HMW component, made in the subsequent step can be calculated using Kim McAuley's equations. Thus, both density and $MFR_2$ can be found using K. K. McAuley and J. F. McGregor: On-line Inference of Polymer Properties in an Industrial Polyethylene Reactor, AIChE Journal, June 1991, Vol. 37, No, 6, pages 825-835. The density is calculated from McAuley's equation 37, where final density and density after the first reactor is known. $MFR_2$ is calculated from McAuley's equation 25, where final $MFR_2$ and $MFR_2$ after the first reactor is calculated.

Prepolymerisation may precede the actual polymerisation step(s), as well known in the field. Then the catalyst, preferably a single site catalyst, is fed to the prepolymerisation step and after said step the obtained reaction mixture together with the catalyst is then fed to the actual polymerisation step(s). In case of a multistage polymerisation, the reaction mixture together with the catalyst which is obtained from the previous polymerisation zone, e.g. a reactor, is then fed to the subsequent polymerisation step to a subsequent reaction zone, e.g. a reactor.

The preferred polymerisation is the multistage polymerisation, wherein the higher density polymer (A) is preferably polymerised in a slurry, such as loop, reactor and the obtained reaction product together with the catalyst, preferably single site catalyst, is then preferably transferred to a gas phase reactor for polymerising the lower density polymer (B) in the presence of the higher density polymer (A). The polymerisation of each stage is preferably carried out as described above. The prepolymerisation may precede the actual polymerisation steps.

Homogenisation and Pelletisation

The Polymer composition comprising the multimodal PE copolymer is homogenised and pelletised using a method known in the art. Preferably, a twin screw extruder is used. Such extruders are known in the art and they can be divided in co-rotating twin screw extruders, as disclosed in WO-A-98/15591, and counter-rotating twin screw extruders, as disclosed in EP-A-1600276 In the co-rotating twin screw extruder the screws rotate in the same direction whereas in the counter-rotating extruder they rotate in opposite directions. An overview is given, for example, in Rauwendaal: Polymer Extrusion (Hanser, 1986), chapters 10.3 to 10.5, pages 460 to 489. Especially preferably a counter-rotating twin screw extruder is used.

To ensure sufficient homogenisation of the Polymer composition during the extrusion the specific energy input must be on a sufficiently high level, but not excessive, as otherwise degradation of polymer and/or additives would occur. The required SEI level depends somewhat on the screw configuration and design and are within the skills of the skilled person. Suitable levels of specific energy input (SEI) are from 200 to 300 kWh/ton, preferably from 210 to 290 kWh/ton.

Polymer Composition

Typically the polymer composition comprises at least 50% by weight of the multimodal PE copolymer, preferably from 80 to 100% by weight and more preferably from 85 to 100% by weight, based on the total weight of the composition. The preferred Polymer composition consists of PE copolymer. The expression means that the Polymer composition does not contain further polymer components, but the multimodal PE copolymer as the sole polymer component. However, it is to be understood herein that the Polymer Composition may comprise further components such as additives which may optionally be added in a mixture with a carrier polymer, i.e. in so called master batch.

The polymer composition may thus contain further additives such as additives conventionally used in W&C applications. Part or all of the optional additives can be added e.g. to the PE copolymer before the above described homogenisation and pelletisation step to obtain the Polymer composition. As an equal alternative, part or all of the optional additives can be added to the Polymer composition after the pelletisation step before or during the preparation process of an article, preferably a Cable, thereof. The additives may be used in conventional amounts.

For instance, Polymer composition may be crosslinkable and contains a crosslinking additive, such as a free radical generating agent for crosslinking via radical reaction, or e.g. a silanol condensation catalyst for crosslinking via hydrolysable silane groups. Preferably, the crosslinking agent contains —O—O— bond or —N=N-bond, more preferably is a peroxide, preferably organic peroxide, such as 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof, however without limiting thereto.

Further non-limiting examples of additive(s) for W&C applications include antioxidant(s), stabiliser(s), scorch retardant agent(s), processing aid(s), flame retardant additive(s), water tree retardant additive(s), acid scavenger(s), crosslinking booster(s), inorganic filler(s), such as carbon black, and voltage stabilizer(s).

Cable and Cable Manufacture

The at least one layer of the Cable comprises at least the Polymer Composition as defined above or below. The Cable layer(s) may also comprise a blend of the Polymer composition together with one or more different Polymer composition(s) and/or with further polymer components.

The Cable is preferably selected from a communication cable for communication applications comprising one or more wires surrounded by at least one layer, which is preferably an insulation layer, and the one wire or a bundle of the two or more wires is then surrounded by at least a sheath layer, which is also called as a jacketing layer and which forms the outermost polymeric layer for protecting the one or more wires, or from a power cable, which comprises a conductor surrounded by at least one layer, preferably at least an insulation layer and a jacketing layer, in that order, wherein at least one layer comprises the Polymer composition as defined above or in claims below. The communication and power cable have a well known meaning in the W&C field.

A communication cable is a cable for transferring information signals like telecommunication cables or coaxial cables. A telecommunication cable comprises a plurality of telesingle wires each surrounded by an insulation composition, typically an insulation layer. The number of telesingle wires may vary from a few in a data transmission cable to up to several thousands in telephone cables. All these wires are then surrounded by a common protective sheath layer, also called as jacketing layer, which surrounds and protects the wire bundle. Preferably the sheath layer comprises, preferably consists of the polymer composition of the invention.

A coaxial cable has typically one centre conductor and at least one outer concentric conductor. If more than one outer conductor is used, e.g. triaxial cables, they are separated by an electrically isolating layer. Also the coaxial cables are surrounded by at least a sheath, also called jacketing, layer. The sheath layer preferably comprises, more preferably consists of, the polymer composition of the invention.

A power cable is a cable transferring energy operating at any voltage, typically operating at voltages higher than 220 V. The voltage applied to the power cable can be alternating (AC), direct (DC), or transient (impulse). The Polymer composition is also very suitable for layers of power cables such as low voltage (LV) (e.g. 1 kV cables), medium voltage (MV), high voltage (HV) and extra high voltage (EHV) power cables, which terms have well known meaning and indicate the operating level of such cable.

The preferable MV, HV and EHV Cable embodiment of the invention comprises at least an inner semiconductive layer, insulation layer, an outer semiconductive layer and optionally, and preferably, a jacketing layer, in that order, wherein at least one of said layers, preferably at least the jacketing layer, comprises, preferably consists of, said Polymer composition of the invention.

The preferable 1 kV cable embodiment of the invention compromises at least an insulation layer and optionally a bedding layer and optionally and preferably, a jacketing layer, in that order, wherein at least one of said layers, preferably at least the jacketing layer, comprises, preferably consist of, said Polymer composition of the invention.

The said at least one layer of the Cable comprising the Polymer composition as defined above or in claims below is very preferable a jacketing layer.

Cables according to the present invention can be produced according to the methods known in the art using the polymer composition as described above.

Accordingly, the invention also provides a process for producing a Cable, which process comprises steps of a) applying on a conductor one or more layers by using the Polymer composition as defined above and below.

The process for producing a Cable, such as a communication or power cable, as defined above and below, comprises melt mixing, i.e. blending the Polymer composition as defined above, including the subgroups and embodiments thereof, optionally with other polymer components and optionally with additives, above the melting point of at least the major polymer component(s) of the obtained mixture, and (co)extruding the obtained melt mixture on a conductor for forming one or more polymer layer(s), wherein at least one contains the Polymer composition. Melt mixing is preferably carried out in a temperature of 20-25° C. above the melting or softening point of polymer component(s). Preferably, said Polymer composition is used in form of pellets which are added to the mixing step and melt mixed. The additives may be added before or during the Cable manufacturing process. The processing temperatures and devices are well known in the art, e.g. conventional mixers and extruders, such as single or twins screw extruders, are suitable for the process of the invention.

The Cable can be crosslinkable, wherein at least one of the layers can be crosslinked to provide a crosslinked Cable. Invention provides also a Cable which is crosslinkable and a crosslinked Cable.

Accordingly, the Cable manufacture process comprises optionally a further subsequent step of b) crosslinking a crosslinkable polymer, e.g. a crosslinkable Polymer composition, in at least one cable layer of the obtained Cable, wherein the crosslinking is effected in the presence of a crosslinking agent, which is preferably a peroxide. Typically the crosslinking temperature is at least 20° C. higher than the temperature used in melt-mixing step and can be estimated by a skilled person.

Usable manufacturing and crosslinking processes and devices are known and well documented in the literature.

Determination Methods

Unless otherwise stated the following methods were used for determining the properties of the PE copolymer as given in the description or in the experimental part and claims below.

Melt Index

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

The quantity FRR (flow rate ratio) is an indication of molecular weight distribution and denotes the ratio of flow rates at different loads. Thus, $FRR_{21/2}$ denotes the value of $MFR_{21}/MFR_2$.

Comonomer Content (NMR)

The comonomer content was determined by quantitative nuclear magnetic resonance (NMR) spectroscopy, 13C-NMR, after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g. "200 and More NMR Experiments: A Practical Course", S. Berger and S. Braun, 2004, Wiley-VCH, Weinheim). The 13C-NMR spectra were recorded on Bruker 400 MHz spectrometer at 130° C. from samples dissolved in 1,2,4-trichlorobenzene/benzene-d6 (90/10 w/w). Quantities were calculated using simple corrected ratios of the signal integrals of representative sites in a manner known in the art.

Density

Density of the polymer was measured according to ISO 1183/1872-2B.

For the purpose of this invention the density of the blend can be calculated from the densities of the components according to:

$$\rho_b = \Sigma w_i \rho_i$$

where $\rho_b$ is the density of the blend, $w_i$ is the weight fraction of component "i" in the blend and $\rho_i$ is the density of the component "i".

Molecular Weight

Mz, Mw, Mn, and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight; Mz is the z-average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 µL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

Flexural Modulus

Flexural modulus was determined according to ISO 178. The test specimens were 80×10×4.0 mm (length×width×thickness). The length of the span between the supports was 64 mm, the test speed was 2 mm/min and the load cell was 100 N. The equipment used was an Alwetron TCT 25.

Heat Distortion Temperature (HDT): Pressure Test at High Temperature for Insulation and Sheathing Materials on Plaques The evaluation of the heat distortion temperature is based on EN60811-3-1:1995, with a slightly varied experimental set up to enable the test of plaques.—see FIG. 1.

Compression moulded test specimens had a thickness of 2 mm. These were placed on top of a wire with 3 mm diameter. The indentation device is shown in the standard EN60811-3-1 and consists of a rectangular blade with an edge 0.70±0.01 mm wide, which is placed on top of the test piece.

The force F in Newtons, which is exerted by the blade upon the test piece is given by the formula:

$$F = 0.6 \cdot \sqrt{2 \cdot D \cdot \delta - \delta^2} \text{ (taken from EN60811-3-8, for cores} \leq 15 \text{ mm)},$$

whereas D is defined as:

$$D = 2 \cdot \delta + d$$

F=applied force on the sample in [N]

δ=mean value of thickness of test plaque in [mm]

d=diameter of wire in [mm]

D=calculated outer diameter of a cable with conductor size d and insulation thickness δ in [mm]

Heating of Loaded Samples:

The test is carried out in an air oven. The temperature is constant throughout the test at the value specified for the test. The loaded, but not preheated sample is kept in the test position for 4 hours. At the end of the 4 hours the test specimens are cooled rapidly under load. This is done by spraying the test piece with cold water on the spot where the blade is pressing. The test piece is removed from the apparatus, when it has cooled to a temperature where recovery of the insulation no longer occurs. The test piece is then cooled further in a water bath to room temperature.

Measurement of the Indentation:

Immediately after cooling the sample should be prepared for measurement of the indentation. The sample is cut along the line where the wire was in contact with the plaque. The indentation of the blade is measured with a microscope. The indentation is determined as the difference between the microscope measurements on the indentation and a spot 3-5 mm from the indentation at the cut surface of the sample.

Evaluation of Results

The result is given as the ratio of indentation depth and sample thickness in percent. The median of indentation values measured on three test specimens shall not be more than 50%. If it is more than 50% the sample is regarded to have failed the test.

Experimental Part:

Examples 1-4 were prepared as described below and they represented the multimodal SS PE polymer and Polymer composition of the invention.

Example 1 was a blend of two commercially available unimodal polyethylene copolymers produced using a single site catalyst, namely 45 wt % of Elite 5401 (Comonomer: octene, density 918 kg/m$^3$ and $MFR_2$ of 1.0 g/10 min, supplier Dow) as the higher density component A and 55 wt % Exact 0203 (Comonomer: Octene, density of 902 kg/m$^3$, $MFR_2$ of 3.0 g/min, supplier ExxonMobil) as the lower density component B. The components were blended mechanically together using a commercial extruder, namely BUSS compounder (602) (Supplier BUSS). The final density of the homogenised bimodal Polymer composition was 910 kg/m$^3$.

Example 2 was a blend of two commercially available unimodal polyethylene copolymers produced using a single site catalyst, namely 53 wt % of Finacene ER2245 (Comonomer: hexene, density of 934 kg/m$^3$, $MFR_2$ of 0.9 g/10 min, supplier Total Petrochemicals) as the higher density component A and 47 wt % of Exact 8201 (Comonomer: octene, density of 882 kg/m$^3$, $MFR_2$ of 1.1 g/10 min, supplier ExxonMobil) as the lower density component B. The components were blended mechanically together using a commercial extruder, namely BUSS compounder (602) (Supplier BUSS). The final density of the homogenised bimodal Polymer composition was 910 kg/m$^3$.

Example 3 was a blend of two unimodal PE copolymers produced using a single site catalyst, namely 50 wt % of ethylene copolymer (Comonomer: hexene, density of 920 kg/m$^3$, $MFR_{21}$ of 1.8 g/10 min) as the higher density component A and 50 wt % of ethylene copolymer (Comonomer: hexene, density of 899 kg/m$^3$, $MFR_2$ of 1.2 g/10 min) as the lower density component B. The components were prepared separately in a bench scale 8 L polymerizations reactor equipped with continuous feeds for ethylene and comonomer in the polymerization conditions outlined in Table 1. The blend was compounded using a commercial Clextral extruder equipped with a multi-elongational mixing die, extruder temperature <270° C. The final density of the homogenised bimodal Polymer composition was 916 kg/m$^3$ and MFR2 was 0.3 g/10 min.

Example 4 was a blend of two unimodal PE copolymers produced using a single site catalyst, namely 48 wt % of ethylene copolymer (Comonomer: hexene, density of 910 kg/m$^3$, $MFR_{21}$ of 0.8 g/10 min) as the higher density component A and 52 wt % of ethylene copolymer (Comonomer: hexene, density of 899 kg/m$^3$, $MFR_2$ of 1.2 g/10 min) as the lower density component B (=component B of Example 3). The components were prepared separately in a bench scale 8 L polymerizations reactor equipped with continuous feeds for ethylene and comonomer in the polymerization conditions outlined in Table 1. The blend was compounded using a commercial Clextral extruder equipped with a multi-elongational mixing die, extruder temperature <270° C. The final density of the homogenised bimodal Polymer composition was 909 kg/m$^3$ and MFR2 was 0.3 g/10 min.

The same metallocene catalyst was used for polymerising the lower and higher PE copolymer components A and B of Example 3 and the lower and higher PE copolymer components A and B of Ex. Catalyst preparation for the components A and B of Example 3 and of Example 4:

Catalyst 1

The catalyst complex used in the polymerisation examples was bis(n-butylcyclopentadienyl)hafnium dibenzyl, ((n-BuCp)$_2$Hf(CH$_2$Ph)$_2$), and it was prepared according to "Catalyst Preparation Example 2" of WO2005/002744, starting from bis(n-butylcyclopentadienyl)hafnium dichloride (supplied by Witco).

12.4 kg of 30 wt % methylalumoxane in toluene (MAO, supplied by Albemarle), 281 gr of (n-BuCp)$_2$Hf(CH$_2$Ph)$_2$ in toluene (67.9 wt %, supplied by Degussa) and 3.6 kg of toluene were mixed for 2 hours at 40 rpm at room temperature. Reactor was carefully flushed with toluene prior to reaction.

The resulting solution was then transferred to a 160 L reactor onto 10.0 kg activated silica (commercial silica carrier, XPO2485A, having an average particle size 20 μm, supplier: Grace, calcined at 600° C. for 4 hours) and mixed at 40 rpm for 2 hours at 20° C.

The catalyst was dried with 15 rpm mixing under nitrogen purge at 60° C. for 2 hours, and thereafter dried with vacuum at 65° C. for 4 hours.

The obtained catalyst had an Al/Hf mol-ratio of 200, an Hf-concentration of 0.33 wt % and an Al-concentration of 11.2 wt %.

TABLE 1

Polymerization conditions for components of Examples 3 and 4

| PE polymerization | Higher density component A of Example 3 | Higher density component A of Example 4 | Lower density component B of Example 3 and Example 4 |
| --- | --- | --- | --- |
| Catalyst | Cat. 1 | Cat. 1 | Cat. 1 |
| Cat. amount (g) | 5.05 | 4.35 | 5.14 |
| Reactor temp. (° C.) | 60 | 60 | 75 |
| i-C4 amount (ml) | 3800 | 3800 | 3800 |
| Hydrogen (ppm in C2) | 0 | 0 | 500 |
| Comonomer | Hexene | Hexene | Hexene |

TABLE 1-continued

Polymerization conditions for components of Examples 3 and 4

| PE polymerization | Higher density component A of Example 3 | Higher density component A of Example 4 | Lower density component B of Example 3 and Example 4 |
|---|---|---|---|
| Comonomer amount (w % in iBu) | 1.8 | 3.5 | 8.8 |
| C2 partial pressure (bar) | 11.2 | 8.8 | 7.4 |
| Total pressure (bar) | 20 | 17.5 | 19 |
| Total run time (min) | 45 | 60 | 45 |
| Amount of polymer (g) | 2300 | 2750 | 2100 |
| MFR 2 (powder) | | | 1.2 |
| MFR 21 (powder) | 1.8 | 0.8 | 23 |
| Density | 920 | 909 | 899 |
| C6-content/powder (wt %) | 4.2 | 5.8 | 9.3 |
| MWD | 3.0 | 3.6 | 2.6 |
| Mw (g/mol) | 255000 | 389000 | 125000 |

As reference (comparative) example, a blend of Low density polyethylene (LDPE) polymers produced in a high pressure tubular reactor was used. LDPE blend: 95 wt % a conventional LDPE and 5 wt % a conventional LDPE ethylene copolymer with vinyl acetate (VA content 28 wt %), density of the blend 918 kg/m$^3$, MFR$_2$ of 0.2 g/10 min. The Blend represents a commercial grade reference for W&C cable layer applications produced by Borealis, Sweden.

Table 2 summarizes the blend components of examples 1-4. The preferable embodiment of property balance between flexibility and HDT passed at 115° C. is shown in Table 3.

TABLE 2

Density, MFR$_2$/MFR$_{21}$ and M$_w$ of each component used in the VLD blends.

| | Higher density component A | | | | Lower density component B | | | |
|---|---|---|---|---|---|---|---|---|
| Blend | Density (kg/m$^3$) | MFR$_{21}$ (g/10 min) | M$_w$ | Split (%) | Density (kg/m$^3$) | MFR$_2$ (g/10 min) | M$_w$ | Split (%) |
| Ex. 1 | 918 | 1.0 (MFR$_2$) | 120.000 | 45 | 902 | 3.0 | 80.000 | 55 |
| Ex. 2 | 934 | 0.9 (MFR$_2$) | 100.000 | 53 | 882 | 1.1 | 100.000 | 47 |
| Ex. 3 | 920 | 1.8 | 255.000 | 50 | 899 | 1.2 | 125.000 | 50 |
| Ex. 4 | 909 | 0.8 | 389.000 | 48 | 899 | 1.2 | 125.000 | 52 |

TABLE 3

HDT and flexural modulus for the P.c. = the obtained Polymer composition of Inventive Examples 1-4.

| Example | Pass HDT At temp. of | Flexural modulus (MPa) | P.c. Density of (kg/m3) | P.c. MFR2 g/10 min |
|---|---|---|---|---|
| Inv. Ex 1 | No | 130 | 910 | |
| Inv. Ex 2 | 115° C. | 200 | 910 | |
| Inv. Ex 3 | 115° C. | 240 | 916 | 0.3 |
| Inv. Ex 4 | 110° C. | 160 | 909 | 0.3 |
| Reference Ex. | No | 220 | | |

The invention claimed is:

1. A cable comprising a conductor surrounded by one or more layers, wherein one of the layers is a jacketing layer and at least the jacketing layer comprises a polymer composition comprising a multimodal copolymer of ethylene with one or more comonomer(s), wherein the multimodal ethylene copolymer comprises
   (A) from 10 to 90% by weight, based on the combined amount of components (A) and (B), of a higher density copolymer of ethylene which has a density of from 918 to 937 kg/m$^3$, and
   (B) from 10 to 90% by weight, based on the combined amount of components (A) and (B), of a lower density copolymer of ethylene which has a density of from less than 925 kg/m$^3$,
   and wherein the multimodal copolymer of ethylene has a density of 900 to 925 kg/m$^3$ and a flexural modulus of 350 MPa or less.

2. The cable according to claim 1 wherein the multimodal ethylene copolymer has the density of from 900 to 920 kg/m$^3$.

3. The cable according to claim 1 wherein the multimodal ethylene copolymer has an Flexural modulus of 300 MPa or less.

4. The cable according to claim 1 wherein the multimodal ethylene copolymer comprises:
   (A) from 10 to 90% by weight, based on the combined amount of components (A) and (B), of a higher density copolymer of ethylene and one or more alpha-olefin(s) having from 3 to 20 carbon atoms, and
   (B) from 10 to 90% by weight, based on the combined amount of components (A) and (B), of a lower density copolymer of ethylene and one or more alpha-olefins having from 3 to 20 carbon atoms.

5. The cable according to claim 1, wherein the lower density copolymer of ethylene (B) has a density of from 870 to 925 kg/m$^3$.

6. The cable according to claim 1 wherein the multimodal ethylene copolymer comprises
   the amount of higher density ethylene copolymer (A) is of 10 to 90 wt %; and
   the amount of lower density ethylene copolymer (B) is of 10 to 90 wt %; based on the combined amount of components (A) and (B).

7. The cable according to claim 1, wherein the higher density copolymer (A) is a copolymer of ethylene and one or more alpha-olefin(s) having from 3 to 10 carbon atoms and the lower density copolymer (B) is a copolymer of ethylene and one or more alpha-olefin(s) having from 3 to 10 carbon atoms.

8. The cable according to claim 1, wherein the higher density copolymer of ethylene (A) and the lower density copolymer of ethylene (B) are prepared by polymerizing ethylene in the presence of a single site catalyst and an activator for said catalyst.

9. The cable according to claim 1 wherein the multimodal ethylene copolymer of the polymer composition has at least one of the following properties:
  (i) A MWD (Mn/Mw) of from 1.5 to 20,
  (ii) Melt index $MFR_2$ of from 0.1 to 5.0 g/10 min
  (iii) The density difference between the component (A) and (B) of the polymer composition is at least 10 $kg/m^3$, or
  (iv) The density of the multimodal copolymer of ethylene is from 905 to 918 $kg/m^3$, the flexural modulus is less than 300 MPa, and the multimodal copolymer of ethylene comprises the lower density ethylene copolymer (B) having a density of from 870 to 925 $kg/m^3$.

10. A process for producing a cable comprising: applying one or more layers on a conductor, where one of the layers is a jacketing layer and wherein at least the jacketing layer comprises a polymer composition comprising a multimodal copolymer of ethylene with one or more comonomer(s), wherein the multimodal ethylene copolymer comprises
  (A) from 10 to 90% by weight, based on the combined amount of components (A) and (B), of a higher density copolymer of ethylene which has a density of from 918 to 937 $kg/m^3$, and
  (B) from 10 to 90% by weight, based on the combined amount of components (A) and (B), of a lower density copolymer of ethylene which has a density of from less than 925 $kg/m^3$,
  and wherein the multimodal copolymer of ethylene has a density of 900 to 925 $kg/m^3$ and a flexural modulus of 350 MPa or less.

11. A polymer composition comprising a multimodal copolymer of ethylene with one or more comonomers, prepared in the presence of a single site catalyst and an activator for said catalyst, and wherein the multimodal ethylene copolymer comprises:
  (A) from 10 to 90% by weight, based on the combined amount of components (A) and (B), of a higher density copolymer of ethylene which has a density of from 918 to 937 $kg/m^3$, and $MFR_2$ of 1.0 g/10 min or less, and
  (B) from 10 to 90% by weight, based on the combined amount of components (A) and (B), of a lower density copolymer of ethylene which has a density of less 925 $kg/m^3$, and wherein
  the multimodal copolymer of ethylene has a density of 900 to 925 $kg/m^3$ and a flexural modulus of 350 MPa or less and $MFR_2$ of 0.1 to 5 g/10 min.

12. The polymer composition according to claim 11, wherein the multimodal ethylene copolymer has the flexural modulus of 300 MPa or less, and $MFR_2$ of from 0.1 to 3.0 g/10 min, and the density of from 900 to 920 $kg/m^3$.

13. The polymer composition according to claim 11 wherein the multimodal ethylene copolymer of the polymer composition has at least one of the following properties:
  (i) the lower density copolymer of ethylene (B) has a density of from 870 to 925 $kg/m^3$,
  (ii) the amount of higher density ethylene copolymer of ethylene (A) is of 30 to 70 wt % and the amount of lower density copolymer of ethylene (B) is of 70 to 30 wt %; based on the combined amount of components (A) and (B),
  (iii) a MWD (Mn/Mw) of from 1.5 to 20,
  (iv) Melt index $MFR_2$ of from 0.1 to 3.0 g/10 min, or
  (v) the density of the polyethylene copolymer of from 905 to 918 $kg/m^3$, the flexural modulus less than 300 MPa and the polyethylene copolymer comprises the lower density ethylene copolymer (B) having a density of from 870 to 925 $kg/m^3$.

\* \* \* \* \*